United States Patent
Kerman et al.

(10) Patent No.: US 6,263,298 B1
(45) Date of Patent: Jul. 17, 2001

(54) METHOD FOR ANALYZING SYSTEM PERFORMANCE

(75) Inventors: Shiri Kerman, Tel Aviv; Haim Kopans, Rishon La Zion; Tomer Shain, Kirron, all of (IL)

(73) Assignee: Precise Software Solutions Ltd., Savion (IL)

( * ) Notice: Subject to any disclaimer, the term of this patent is extended or adjusted under 35 U.S.C. 154(b) by 0 days.

(21) Appl. No.: 09/133,532

(22) Filed: Aug. 13, 1998

(51) Int. Cl.[7] .............................. G06F 11/30; G06F 15/00; G21C 17/00
(52) U.S. Cl. ............................................. 702/186; 711/167
(58) Field of Search ................... 702/81, 83, 84, 702/121–123, 176–188, 79, 80; 711/167; 714/5

(56) References Cited

U.S. PATENT DOCUMENTS

| | | | |
|---|---|---|---|
| 5,062,055 | * 10/1991 | Chinnaswamy et al. | ............ 702/182 |
| 5,495,607 | * 2/1996 | Pisello et al. | ............ 707/10 |
| 5,557,548 | * 9/1996 | Gover et al. | ............ 702/176 |
| 5,768,500 | * 6/1998 | Agrawal et al. | ............ 714/47 |
| 5,936,794 | * 8/1999 | Mizukami et al. | ............ 360/92 |

\* cited by examiner

*Primary Examiner*—Kamini Shah
*Assistant Examiner*—Manuel L. Barbee
(74) *Attorney, Agent, or Firm*—Davidson, Davidson & Kappel, LLC

(57) ABSTRACT

A method for monitoring a computer system, the method comprising the steps of analyzing access requests, thereby determining its respective waiting time period, detecting from the waiting time periods selected waiting time periods which exceed a predetermined threshold value, retrieving information relating to waiting access requests which are associated with selected waiting time periods, retrieving information relating to at least one storage unit, which is associated with waiting access requests; and retrieving information relating to at least one storage device, containing at least one storage unit.

10 Claims, 6 Drawing Sheets

METHOD FOR ANALYZING SYSTEM PERFORMANCE

FIELD OF THE INVENTION

The present invention relates to a method for analyzing the performance of a computerized system, in general and to a method for analyzing a computer system, both software and hardware, in particular.

BACKGROUND OF THE INVENTION

Database related software environments as well as hardware environments are known in the art. A large scale software environment often includes a plurality of software applications, for managing a plurality of storage devices, such as disk drives and memory devices, which include storage units, such as files.

One popular database related software environment is the Oracle software package, manufactured and sold by the Oracle Corporation. The Oracle software is generally directed to managing resources, both in software sessions and in the processed data. This is a large scale software product which is capable of processing and managing large amounts of data, for a plurality of users.

Conventionally, database related software environments provide a high level interface language, for use by an end-user or a developer, in the form of statements which are associated with the systems database. These statements control input and output flow, as well as execution of database objects, which are associated with the software environment.

It will be appreciated by those skilled in the art, that the tuning of such software environment is required to optimize their performance, especially, for large scale systems.

Methods for tuning such software applications are known in the art. One such tuning method is implemented in the Oracle Trace software product, manufactured and sold by the Oracle Corporation. According to this method, the length of a queue of statements which access a selected database object, is measured. This length is directly proportional to the load which is currently applied on the selected objet.

Storage device managing systems, are known in the art, for managing storage hardware environment, which includes a plurality of storage devices. Such systems attempt to optimize the performance of a storage hardware environment by detecting the amount of I/O activity through each storage device, which is directly proportional to the load applied thereon.

Reference is now made to FIG. 1, which is a schematic illustration of a method for tuning a software application, known in the art.

In step 102, the processing activities within the system are sampled. The sampled processing activities include software procedures as well as operating system sessions. The results of this step are then provided to a user in a visual format (step 106).

In step 104, the access activities within the system are sampled. The sampled access activities include data object access requests. The results of this step are then provided to a user in a visual format (step 108).

In step 110, the user which operates according to the method of the prior art, decides upon the action which is to be taken. Such an action can include a changing or updating the configuration of the system (step 112), duplicating an item which is heavily accessed (step 114), moving an item from a loaded sub-environment (step 116), such as a processor or a storage device and adding a storage device (step 118).

Reference is now made to FIG. 2, which is a schematic illustration of a method for tuning a storage hardware system, known in the art.

In step 202, the hardware storage activities are sampled. These hardware storage activities include storage hardware device access requests, as well as storage data distribution over and between the plurality of storage devices.

In step 204, the performance characteristics of each of the storage devices are detected. Conventionally, this step is performed by processing the information gathered in the previous step.

In step 206, the detected performance characteristics are displayed to a user.

In step 208, the data distribution is rearranged according to the decision of the user.

None of the above methods provide a complete and optimized solution to the problem presented by such complex systems.

SUMMARY OF THE PRESENT INVENTION

It is an object of the present invention to provide a novel method for monitoring a computer system, both software and hardware, and for analyzing, detecting and retrieving information relating thereto which overcomes the disadvantages of the prior art.

In accordance with the present invention, there is thus provided a method for monitoring a computer system having a plurality of storage devices and processing means connected thereto. The storage devices containing a plurality of storage units. The processing means processing a plurality of access requests to the storage units.

The method in accordance with the present invention comprise the steps of:

analyzing each said access requests, thereby determining its respective waiting time period, detecting from said waiting time periods selected waiting time periods which exceed a predetermined threshold value, retrieving information relating to waiting access requests which are associated with said selected waiting time periods, retrieving information relating to at least one of said storage units, which is associated with said waiting the access requests, and retrieving information relating to at least one storage device, containing said at least one storage units.

In accordance with another aspect of the present invention, the method further includes the preliminary steps of detecting the distribution of said storage units among said storage devices, and storing information indicative of said detected distribution.

In accordance with another aspect of the present invention, the method further includes the step of providing said information to a user.

In accordance with another aspect of the present invention, the method further includes the step of adjusting resource distribution within said computer system.

In accordance with another aspect of the present invention, the method wherein said step of adjusting resource distribution further includes a sub-step of distributing access requests of the same nature of said detected waiting access requests.

In accordance with another aspect of the present invention, the method wherein said step of adjusting resource distribution further includes a sub-step of relocating said at least one storage unit to others of said storage devices.

In accordance with another aspect of the present invention, the method wherein said step of adjusting resource distribution further includes a sub-step of duplicating said at least one storage unit to others of said storage devices.

In accordance with another aspect of the present invention, the method further includes the step of detecting when the number of said waiting access requests exceeds a predetermined value.

In accordance with another aspect of the present invention, the method further includes the step of detecting when the number of said access requests which are associated with a selected one of said storage units, exceeds a predetermined value.

In accordance with another aspect of the present invention, the method further includes the step of detecting when the number of said access requests which are associated with a selected one of said storage devices, exceeds a predetermined value.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by providing a novel method for analyzing the performance of a computerized system.

The present invention provides a method for integrated hardware-software analysis of database systems.

Figure 1:
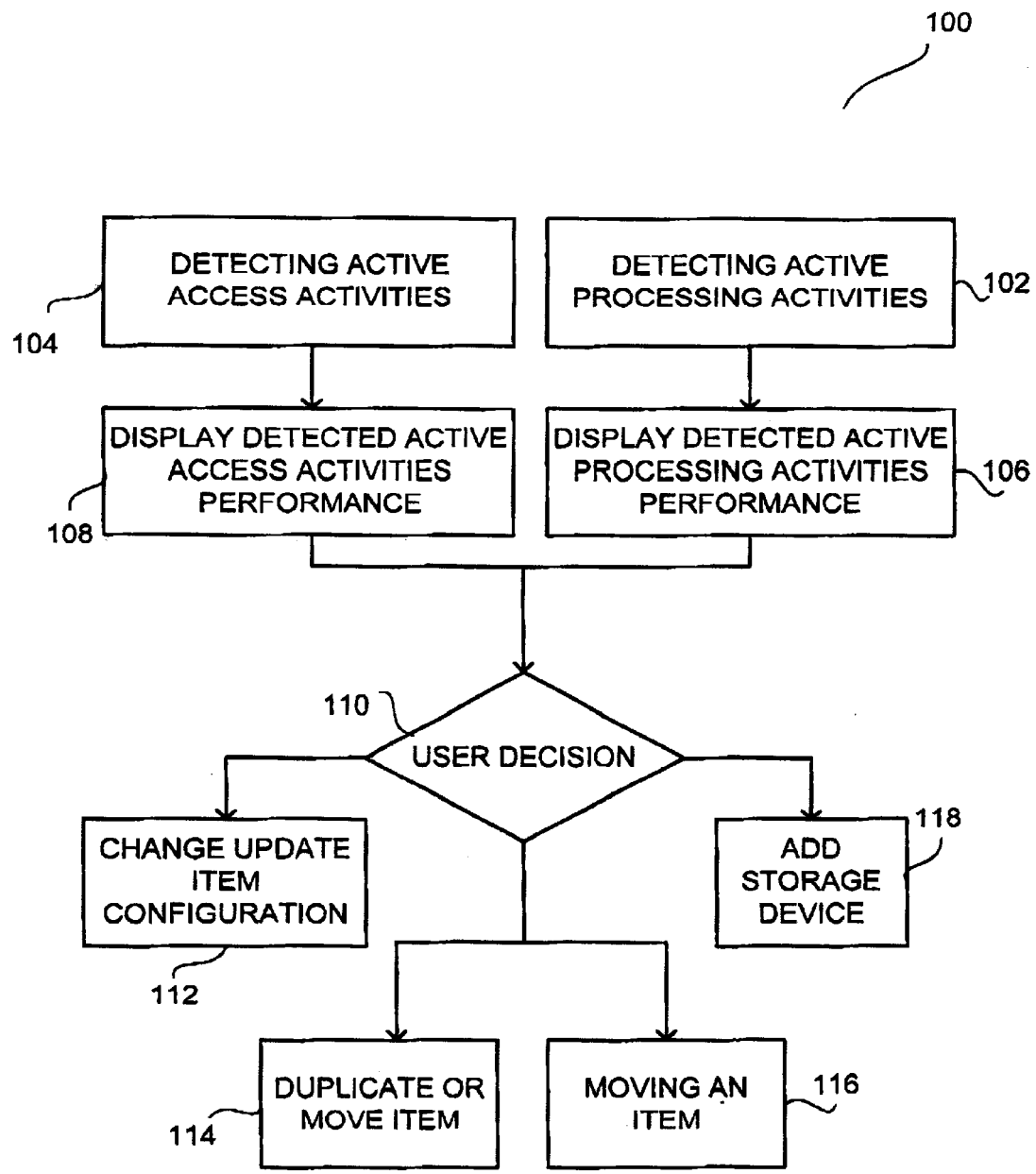
FIG. 1 is a schematic illustration of a method for tuning a software application, known in the art.
Figure 2:
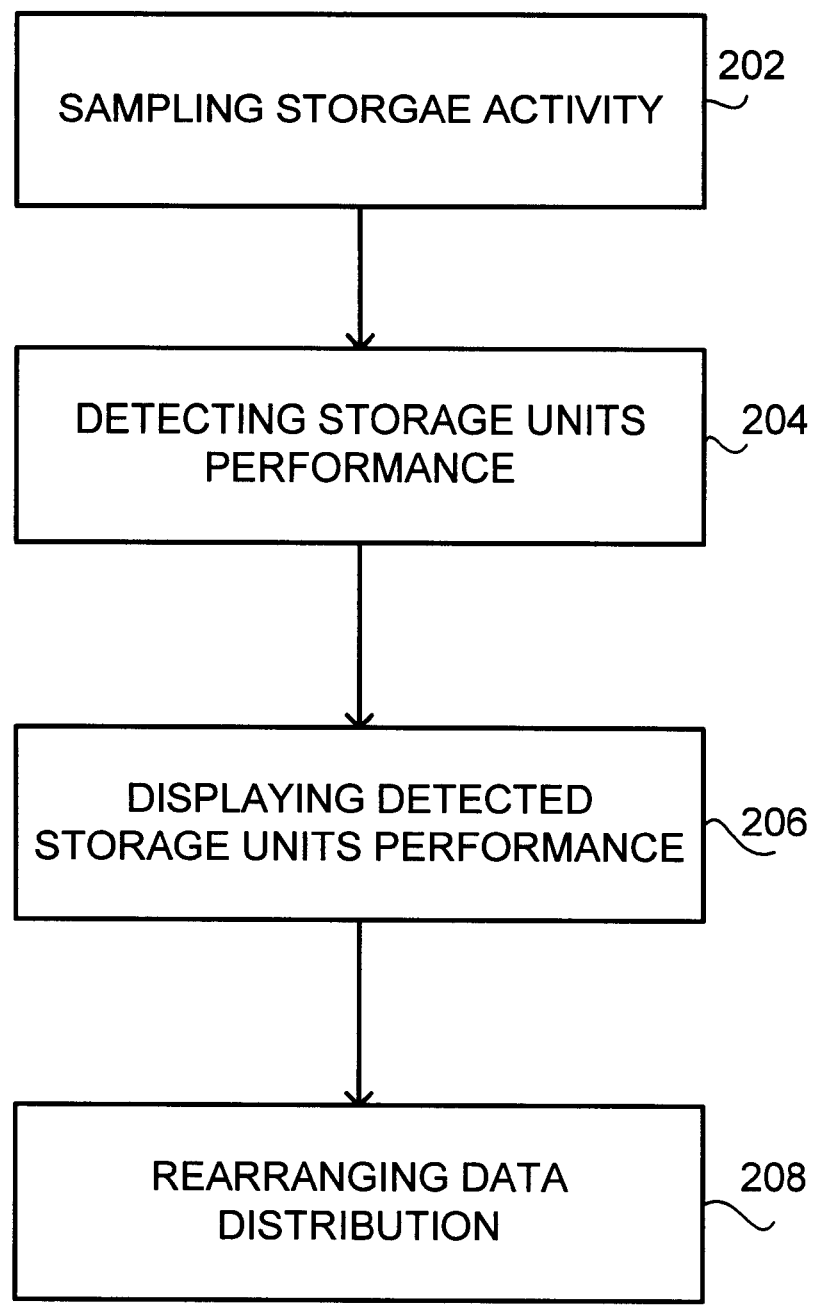
FIG. 2 is a schematic illustration of a method for tuning a storage hardware system, known in the art.
Figure 3:
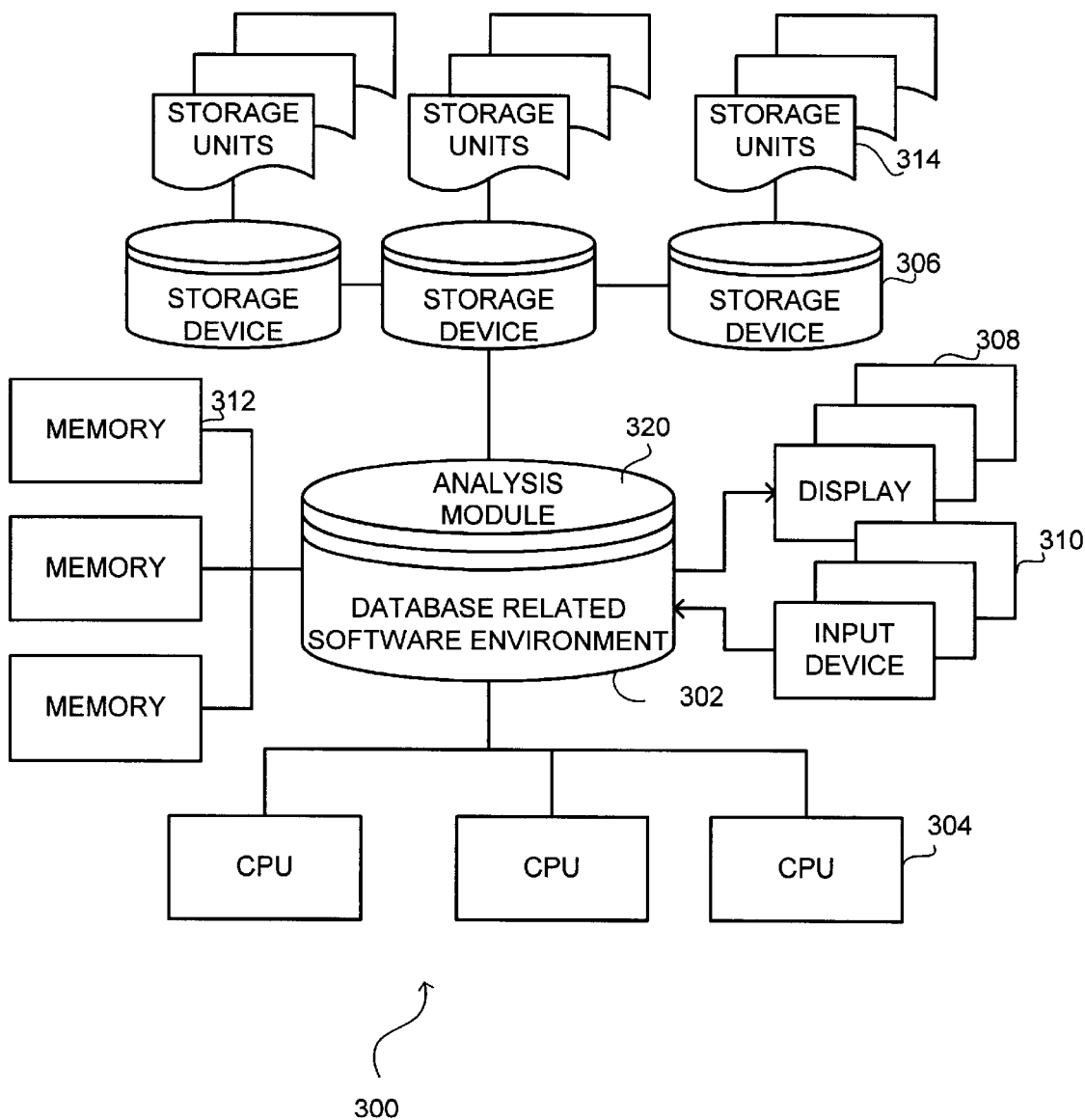
FIG. 3 is a schematic illustration of a database system, generally referenced 300.

Reference is now made to FIG. 3, which is a schematic illustration of a database system, generally referenced 300.

System 300 includes a database related software environment 302, a plurality of display units 308, a plurality of input devices 310, a plurality of central processing units (CPU) 304, a plurality of memory units 312 and a plurality of storage devices 306. The database related software environment 302 includes an analysis module 320, which analyzes access aspects within system 300, according to the method of the present invention, as will be described herein below.

Each of the storage devices 306 includes a plurality of storage units 314 which consist of files and the like.

Database related software environment 302 is connected to the display units 308, the input devices 310, the central processing units (CPU) 304, the memory units 312 and to the storage devices 306.

Each of the input devices 310 is selected from the group consisting of a keyboard, a mouse, another pointing device, an external storage unit, a communication line and the like.

The database related software environment 302 is a collection of applications which provide access to the storage units 314 within the storage devices 306. These applications are executed by the CPUs 304. The memory units 312 provide temporary storage area for various calculations and data.

Figure 4:
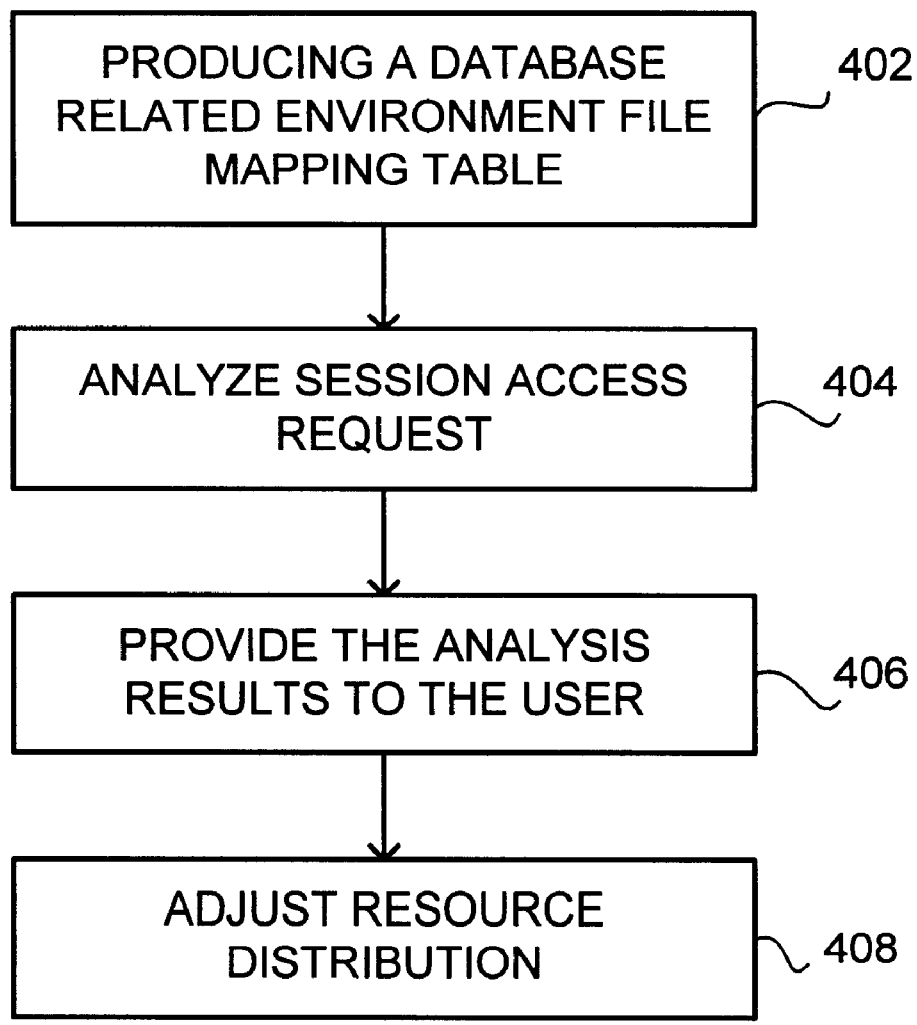
FIG. 4 is a schematic illustration of a method for analyzing performance of system 300 of FIG. 3, operative in accordance with a preferred embodiment of the present invention.

Reference is now made to FIG. 4 which is a schematic illustration of a method for analyzing performance of system 300 of FIG. 3, operative in accordance with a preferred embodiment of the present invention.

In step 402, the analysis module 320 scans system 300 and produces a database related environment file mapping table, thereof. The file mapping table is used to associate storage units 314 with database related environment sessions.

A database related environment session is an element which provides an indication with respect to system processes. Conventionally, a database related environment session is created each time a user interacts with system 300. Such a session can include information with respect to an I/O request, currently in progress.

In step 404, the analysis module 320 analyzes the sessions thereby detecting access requests which are currently in progress and further analyses the elements which might inflict on the progression of these access requests.

Analysis of such elements can include either determining whether a particular database related environment session has requested access to an I/O device, determining the length of the queue of access requests to a selected I/O device, or determining the length of the queue of access requests to a selected I/O unit.

In step 406, the analysis module 320 provides the analysis results to the user, via the display units 308. It will be noted that these results can be provided as output in a many ways, such as printing, storing in a storage device, transmitting via a communication line, provided as audible alert and the like.

In step 408, the analysis module 320 adjusts the resource distribution, either automatically or according to commands provided by user.

Figure 5:
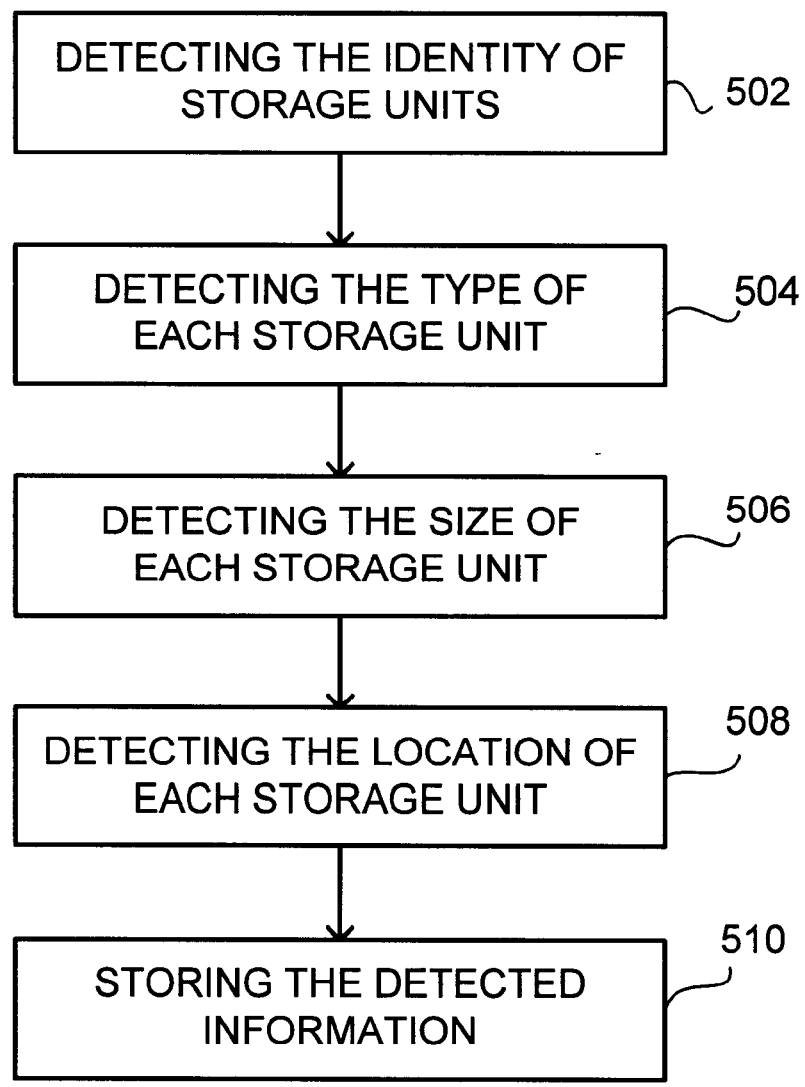
FIG. 5 is a schematic illustration in detail of step 402 of the method of FIG. 4.

Reference is now made to FIG. 5 which is a schematic illustration in detail of step 402 of the method of FIG. 4.

In step 502 the analysis module 320, detects the identity of storage units 314. Such storage units 314 consist of files of various types. In the detection procedure, the analysis module 320 accesses a database related environment dictionary and obtains the names of all storage units 314.

A database related environment dictionary stores in a form of tables information relating to the resource distribution within the database system.

In step 504, the analysis module 320 detects the type of each of these storage units. Conventionally, storage unit types include file system, raw data device, logical volume type and the like.

A raw data device is a predetermined portion of a storage device which can be directly accessed. A logical volume is an interface application which manages structures of user predetermined storage devices, or portions thereof. A structures of user predetermined storage device can include a raw data device. A file system is an infrastructure application which manages structures of data. Such an application collects and manages information relating to structures of data, which are located in a selected storage device. File system managed structures of data can include a logical volume.

In step 506, the analysis module 320 detects the size of each of these storage units 314.

In step 508, the analysis module 320 detects the addresses which determine the location of each storage unit within its respective storage device 306.

In step 510, the analysis module 320 stores the detected information either in a storage device 314 or in a memory unit 312.

Figure 6:
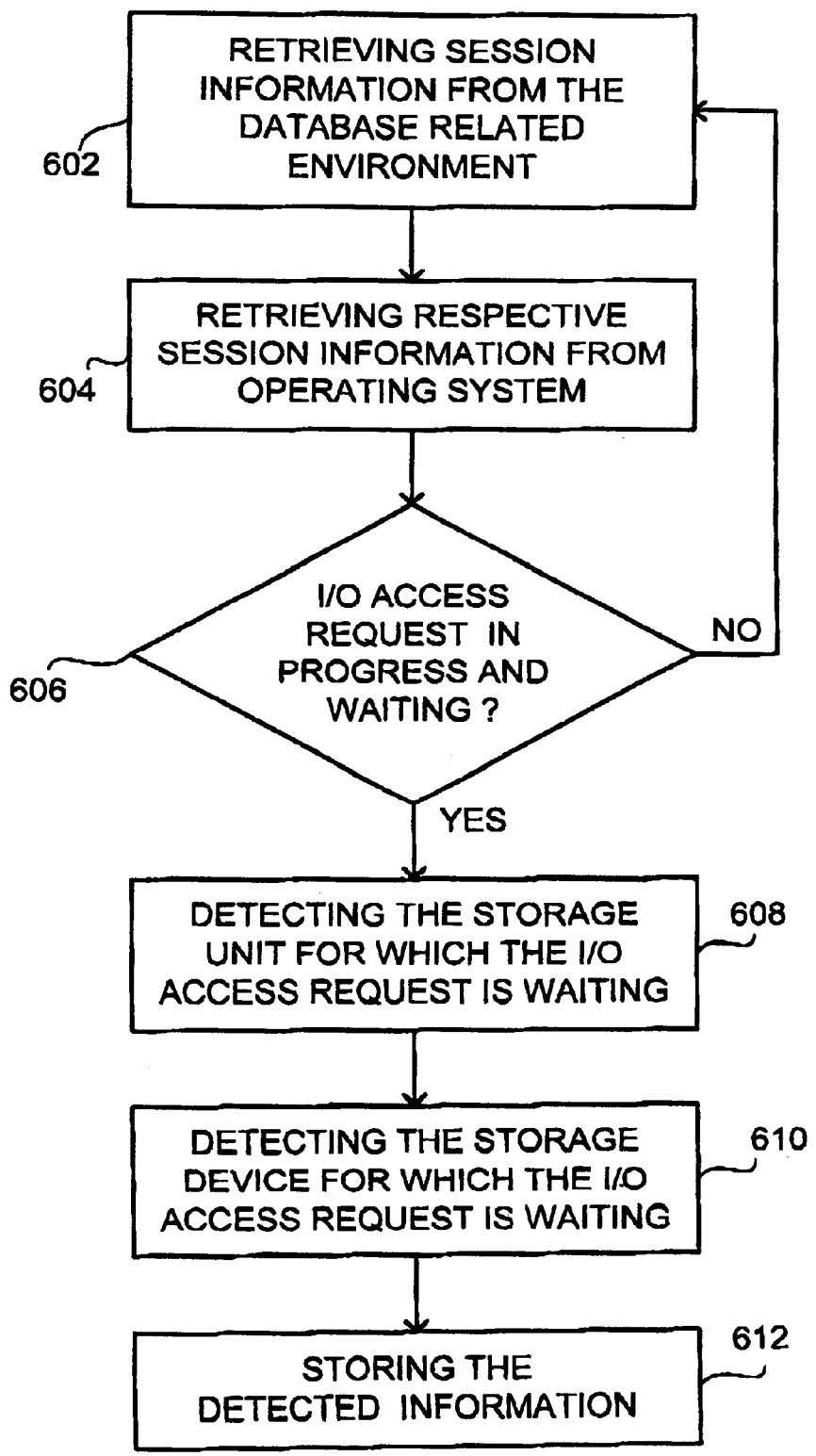
FIG. 6 is a schematic illustration in detail of step 404 of the method of FIG. 4.

Reference is now made to FIG. 6, which is a schematic illustration in detail of step 404 of the method of FIG. 4.

In step 602, the analysis module 320 retrieves the session information from the database related environment. This session information is stored in a shared memory region, which contains data and control information.

In step 604, the analysis module 320 retrieves the respective session information from the operating system. This session information is stored in the operating system control blocks.

In step 606, the analysis module 320 verifies the session information from both sources and detects if the session is waiting to access an I/O device. If so, then the analysis module 320 proceeds to step 608. Otherwise, the analysis module 320 proceeds to step 602.

In step 608, the analysis module 320 detects the identity of the storage unit for which the I/O access request waiting, from the retrieved session information. For example, such identification can include the storage unit name.

In step 610, the analysis module 320, detects the location of the target of the waiting I/O access request.

In step 612, the analysis module 320 stores the detected information either in a storage device 314 or in a memory unit 312.

It will be appreciated by persons skilled in the art that the present invention is not limited to what has been particularly shown and described herein above. Rather the scope of the present invention is defined only by the claims which follow.

What is claimed is:

1. In a computer system including a plurality of storage devices and processing means connected thereto, the storage devices containing a plurality of storage units, the processing means processing a plurality of access requests of a particular session to the storage units, a method for monitoring said computer system implemented in a software object the method comprising the steps of:

analyzing each of said access requests, thereby determining its respective I/O waiting time period;

detecting from said waiting time periods selected waiting time periods which exceed a predetermined threshold value;

retrieving information relating to waiting access requests which are associated with said selected waiting time periods;

retrieving information relating to at least one of said storage units, which is associated with said waiting access requests; and retrieving information relating to at least one storage device, containing said at least one storage unit.

2. The method according to claim 1 further comprising the preliminary steps of:

detecting the distribution of said storage units among said storage devices; and storing information indicative of said detected distribution.

3. The method of claim 1 further comprising the step of providing to a user the information relating to waiting access requests which are associated with said selected waiting time periods, the information relating to at least one of said storage units which is associated with said waiting access requests and the information relating to at least one storage device containing said at least one storage unit.

4. The method according to claim 1 further comprising the step of adjusting resource distribution within said computer system.

5. The method according to claim 4, wherein said step of adjusting resource distribution comprises a sub-step of distributing access requests of said detected waiting access requests.

6. The method according to claim 4, wherein said step of adjusting resource distribution comprises a sub-step of relocating said at least one storage unit to others of said storage devices.

7. The method according to claim 4, wherein said step of adjusting resource distribution comprises a sub-step of duplicating said at least one storage unit to others of said storage devices.

8. The method according to claim 1, further comprising the step of detecting when the number of said waiting access requests exceeds a predetermined value.

9. The method according to claim 1, further comprising the step of detecting when the number of said access requests which are associated with a selected one of said storage units, exceeds a predetermined value.

10. The method according to claim 1, further comprising the step of detecting when the number of said access requests which are associated with a selected one of said storage devices, exceeds a predetermined value.

\* \* \* \* \*